(12) United States Patent
Wasserstrom et al.

(10) Patent No.: US 11,645,075 B1
(45) Date of Patent: May 9, 2023

(54) PROGRAM FLOW CLASSIFICATION

(71) Applicant: Amazon Technologies, Inc., Seattle, WA (US)

(72) Inventors: Barak Wasserstrom, Mitzpe Aviv (IL); Adi Habusha, Alonei Abba (IL); Ron Diamant, Santa Clara, CA (US); Erez Sabbag, Koranit (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/305,152

(22) Filed: Jun. 30, 2021

(51) Int. Cl.
    *G06F 9/30*     (2018.01)
    *G06F 9/455*     (2018.01)
    *G06N 3/08*     (2023.01)
    *G06K 9/62*     (2022.01)
    *G06F 9/38*     (2018.01)

(52) U.S. Cl.
    CPC ........ *G06F 9/30058* (2013.01); *G06F 9/3836* (2013.01); *G06F 9/45558* (2013.01); *G06K 9/6256* (2013.01); *G06N 3/08* (2013.01)

(58) Field of Classification Search
    CPC ............... G06F 9/30058; G06F 9/3836; G06F 9/45558; G06K 9/6256; G06N 3/08
See application file for complete search history.

(56) References Cited

U.S. PATENT DOCUMENTS

| | | | | |
|---|---|---|---|---|
| 6,374,367 | B1* | 4/2002 | Dean ....................... | G06F 8/445 714/E11.2 |
| 2002/0059154 | A1* | 5/2002 | Rodvoid ................ | G06N 3/086 706/26 |
| 2004/0123075 | A1* | 6/2004 | Almog .................. | G06F 9/3844 712/241 |
| 2005/0235170 | A1* | 10/2005 | Atkinson ............... | G06F 9/3842 713/320 |
| 2011/0291746 | A1* | 12/2011 | Ibrahim ................ | G06F 1/3287 702/61 |
| 2015/0248118 | A1* | 9/2015 | Li .......................... | G06N 3/084 706/12 |
| 2017/0093897 | A1* | 3/2017 | Cochin ................. | H04L 63/145 |
| 2018/0018559 | A1* | 1/2018 | Yakopcic ............. | G11C 13/004 |
| 2019/0236598 | A1* | 8/2019 | Padmanabhan .... | G06Q 20/0655 |

OTHER PUBLICATIONS

Jiménez, D. A., et al., "Neural Methods for Dynamic Branch Prediction," *ACM Transactions on Computer Systems*, vol. 20, No. 4, Nov. 2002, pp. 369-397. [DOI: 10.1145/571637.571639].

* cited by examiner

*Primary Examiner* — Farley Abad
(74) *Attorney, Agent, or Firm* — Weaver Austin Villeneuve & Sampson LLP (57) ABSTRACT

Execution flows of a program can be characterized by a series of execution events. The rates at which these execution events occur for a particular program can be collected periodically, and the execution events statistics can be utilized for both training a machine learning model, and later on for making classification inferences to determine whether a program run contains any abnormality. When an abnormality is encountered, an alert can be generated and provided to supervisory logic of a computing system to indicate that an abnormal program flow has been detected.

21 Claims, 8 Drawing Sheets

| Branch 502 | History of M most-recent branch decisions 504 | Prediction success history 506 | Prediction hit-rate 508 | Prediction hit-rate mean 510 | Prediction hit-rate bounds 512 |
|---|---|---|---|---|---|
| Branch[1] | 1,0,0,1,1,1,...,1 | 1,1,1,0,1,0,...,1 | 0.78 | 0.70 | [0.5, 0.9] |
| Branch[2] | 0,0,0,1,0,1,...,0 | 1,1,1,0,1,1,...,1 | 0.97 | 0.98 | [0.9, 1.0] |
| ... | ... | ... | ... | ... | ... |
| Branch[N] | 1,1,1,1,1,1,...,1 | 0,0,0,1,0,0,...,0 | 0.22 | 0.90 | [0.7, 1.0] |

PROGRAM FLOW CLASSIFICATION

BACKGROUND

A computing system can be subject to various security threats. These threats may include installation of persistent malware, tapping into a system to obtain data or information, impersonating a system to interact with other systems, and/or hacking into a running system. Installation of persistent malware can be prevented by using a root of trust and an authentication chain to ensure only authorized entities can install software on the system. Tapping into a system can be prevented by employing an interface encryption scheme. System impersonation can be prevented by using unique device secrets and challenge-response schemes. Hacking of a running system is perhaps the most challenging to prevent. Some common approaches to prevent hacking includes maintaining permissions per specific users and resources and also monitoring events.

BRIEF DESCRIPTION OF THE DRAWINGS

Various embodiments in accordance with the present disclosure will be described with reference to the drawings, in which.

DETAILED DESCRIPTION

Hacking attempts can be hard to detect. A hacked system may not initially manifest itself into any noticeable difference for a user. A user may experience intermittent system slow down, but may not realize that the system has been hacked until the system is fully compromised. Hacking attempts that target new security flaws can be especially hard to detect because the impact of the security flaw and the signature of the hack is not yet widely known or understood. Nevertheless, it is likely that the execution flow of programs running on a computing system will change when the system is hacked or during a hacking attempt. As such, detecting abnormalities of program execution flow can be a good indication that a system may have been compromised.

The techniques disclosed herein provides an effective mechanism to detect abnormal execution flows of a program by classifying program flows into accepted normal behavior and program flows that deviates from normal behavior. A deviation from the normal program flow can be a good indication of a system being hacked. The greater the deviation, the more likely that the system has been compromised. Because each software program is coded and executed differently, the techniques disclosed herein does not depend on the particular software architecture, and can be applied to different software programs by learning the normal execution flow of the specific software program.

Execution flows of a program can be characterized by a series of execution events. For instance, execution flows of a software program can be characterized, for example, by which branch instructions are taken, which processor instructions are executed, which lines of code are run, which interrupt events are encountered, and/or what utilization levels of execution units in the computing system are reached, etc. The techniques disclosed herein periodically collect the rates at which these execution events occur for a particular program, and utilize the execution events statistics for both training a machine learning model (e.g., neural network model, linear regression model, etc.), and later on for making classification inferences to determine whether a program run contains any abnormality. When an abnormality is encountered, an alert can be generated and provided to supervisory logic of a computing system (e.g., kernel, hypervisor, etc.) to take corrective actions.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

Figure 1:
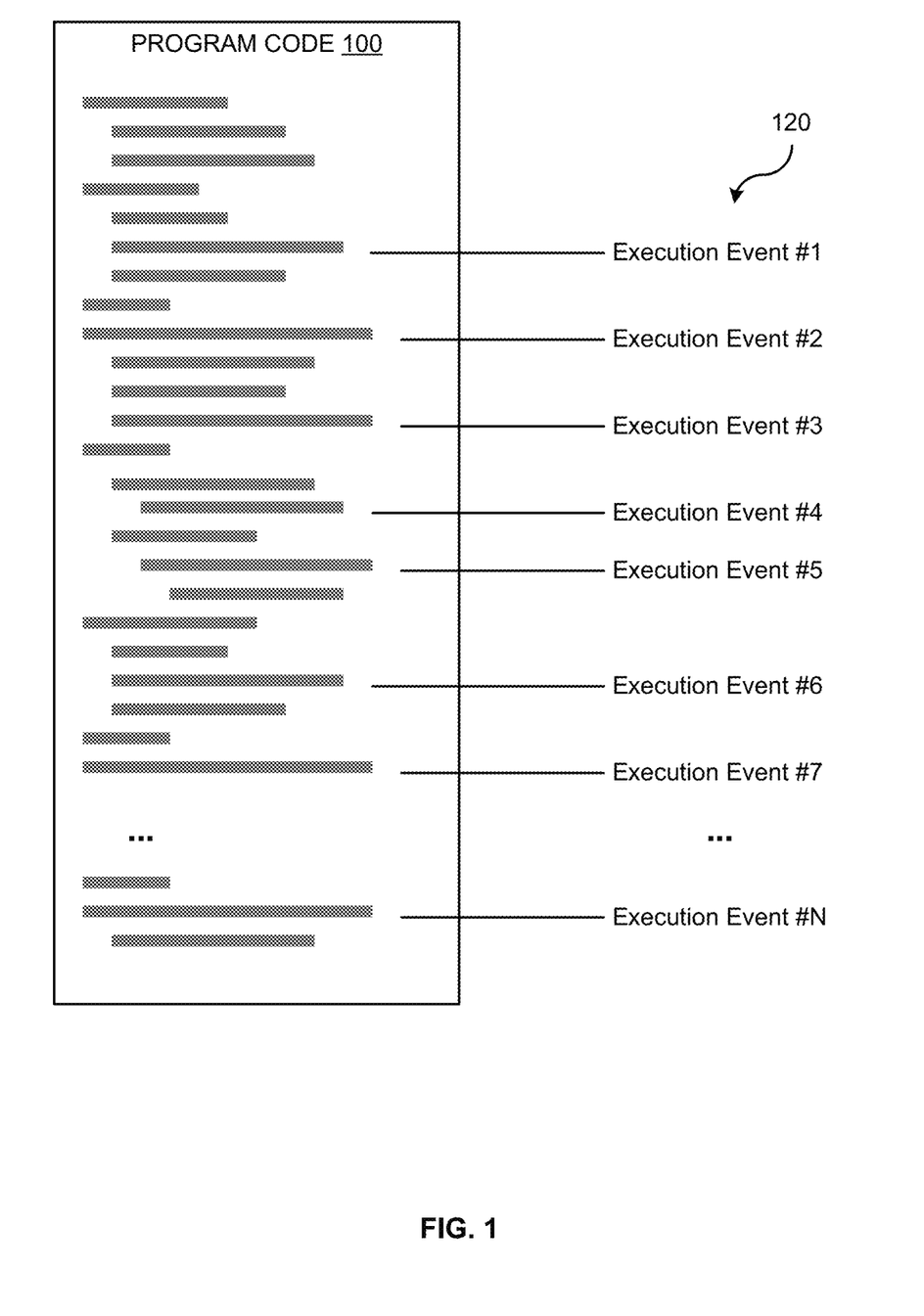
FIG. 1 illustrates an example of a software program.

FIG. 1 illustrates an example of program code 100 of a software program according to some implementations. Program code 100 can be, for example, source code, compiled code, or machine level instructions that can be executed on a computing system. In some implementations, program code 100 may implement application software (e.g., user programs), system software such as an operating system, driver software, or even supervisory software such as a kernel, etc. Program code 100 may include tens of thousands or even millions of lines of codes or instructions. In some implementations, certain sections of program code 100 may correspond to execution events. By way of example, each branch instruction of a program may correspond to an execution event. Referring to FIG. 1, a program may include N number of branch instructions at various locations in program code 100, and each branch instruction may correspond to one of the execution events 120.

A branch instruction is an instruction that causes the execution flow to jump from one sequence of the code to another. An "if-else" statement can be a form of branch instruction in which the program flow continues if a condition is met, but jumps to a different sequence of code if the condition is not met (or vice versa). Execution flows of a program can be represented as various routes in a big decision graph that is controlled by branch instructions. As such, each branch instruction of a program can be identified as an individual execution event, and a program flow can be characterized by how often each branch instruction is encountered, and how often each branch instruction is taken to jump to a different sequence of code.

In some implementations, other types of execution events can be used to characterize a program flow. For example, a program flow can be characterized by how many times each line of code is executed, or how many times each program instruction is executed, etc. In these examples, every line or section of program code 100 may correspond to an individual execution event. As such, in some instances, the total number of execution events may correspond to the total number of lines or sections of code in program 100. In some implementations, the execution events can be a manifestation of executing program code 100, and may not necessarily correlate with a specific line or section of program code 100.

For example, an execution event may correspond to an interrupt that is generated during program execution, and a program flow can be characterized by how often different interrupts are encountered during execution of program code 100. As another example, an execution event may correspond to reaching a particular utilization level of an execution unit (e.g., processor load) in a computing system, and a program flow can be characterized by fluctuations of utilization levels of the various execution units of a computing system. In some implementations, an execution event can also be a combination of such characteristics. For example, an execution event may correspond to how often a combination of branch instructions are taken, or how often a branch instruction is taken in combination with execution of a specific instruction, etc. It should be understood that these are just examples of execution events that can be used to characterized a program flow, and that other program execution related characteristics such as memory usage, packet transmission rates, etc., or various combinations thereof can be used.

To train a machine learning model to detect whether a program flow is normal or contains an abnormality, execution events statistics can be collected during multiple executions of the software program in a controlled environment. A controlled environment can be, for example, before the software program is released for general use, or when the computing system is running in isolation (e.g., with network connectivity disabled to prevent remote threats), etc. During training, the software program can be executed using valid input data to mimic normal usage of the program for supervised learning. In some implementations, the software program can also be executed using random and/or invalid input data to mimic abnormal execution flows during training.

The execution events statistics can be collected at a periodic interval, for example, every time period of 1 second, 5 seconds, or 10 seconds, etc. The execution events statistics can be collected over back-to-back time periods (e.g., discrete time periods), or over a continuous sliding window of the time period duration such that each time period overlaps with the next. In some implementations, the execution event statistics may include occurrence history information of each execution event within the time period, such as a count of the number of occurrences of the particular execution event during that time period. The duration of the time period can be adjusted based on how the particular program executes such that meaningful statistics are collected. For instance, if most counts are low or zero when the collection time period is set to 1 second, then the duration of the time period can be increased to 5 seconds such that meaningful count values are collected.

By way of example, if the execution events are branch instructions of a program, the execution events statistics can be branch instruction statistics collected for the branch instructions of the program during execution of the program in the controlled environment. The branch instruction statistics can include, for each branch instruction in the program, a count of the number of times that a branch of the branch instruction is taken, and a count of the number of times that a branch instruction has been encountered during the collection time period. The branch statistics can be stored in a branch statistics table (BST), and each branch instruction can be assigned an address in the BST.

Figure 2:
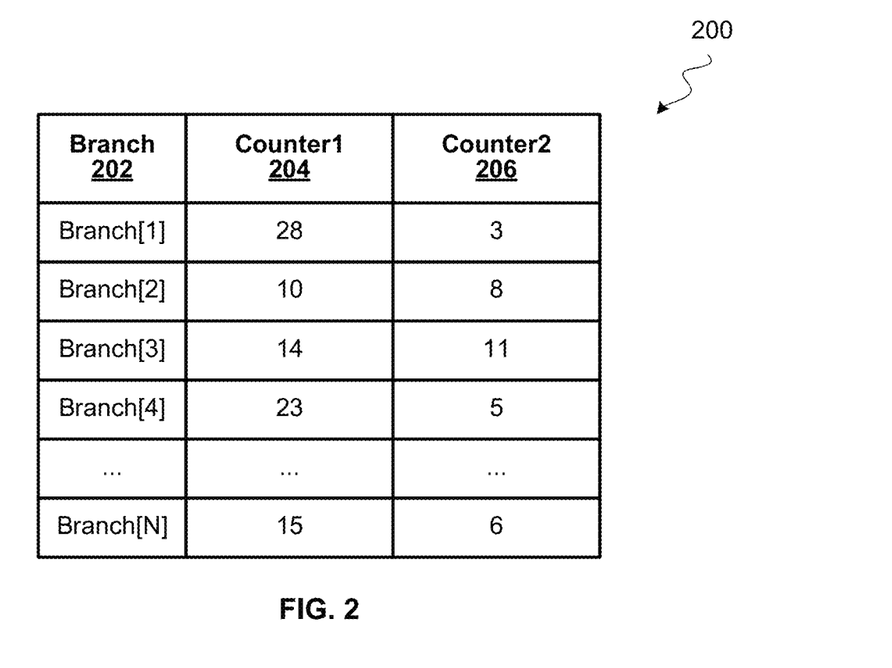
FIG. 2 illustrates an example of a branch statistics table.

FIG. 2 illustrates an example of a BST 200, according to some implementations. BST 200 may include, for each branch instruction, a branch identifier 202, a first counter value 204, and a second counter value 206. Branch identifier 202 can be used to uniquely identify each branch instruction in the program being executed. The branch identifier 202 can be an address or index that is used to access the counter values associated with the branch instruction. Counter value 204 can be a count of the number of times that a branch instruction is encountered within a time period during execution of the program. Counter value 206 can be a count of the number of times that a branch instruction is actually taken within a time period during execution of the program. The number of times that a branch instruction is actually taken is less than the number of times that a branch instruction is encountered because not all branches are taken when a branch instruction is encountered. A branch instruction is taken when the execution flow jumps from one instruction sequence to a different instruction sequence (e.g., when a certain condition of the branch instruction is met, or vice versa). A software program may include tens of thousands or even millions of branch instructions. As such, maintaining BST 200 can, in some instances, take up a significant amount of memory resources to store the counter values.

Figure 3:
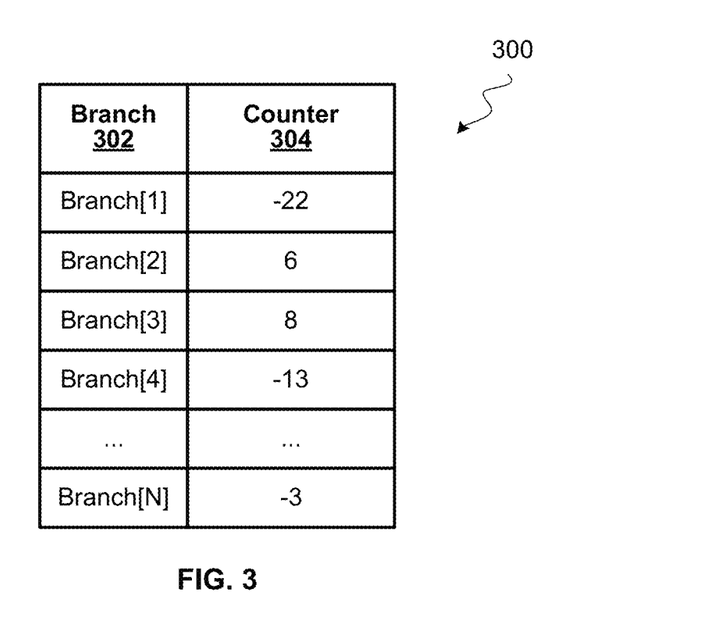
FIG. 3 illustrates another example of a branch statistics table.

To reduce the number of counter values that need to be stored, counter value 204 can be combined with counter value 206 in some implementations. For example, the occurrence history information being collected may include, for each branch instruction, a counter value counting a difference between the number of times a branch instruction is taken and the number of times a branch instruction is not taken within the time period. This effectively reduces the memory footprint of BST 200 by half. FIG. 3 illustrates an example of a BST 300 that combines counter value 204 and counter value 206 of BST 200. As shown in FIG. 3, BST 300 includes, for each branch instruction, a branch identifier 302 and a single counter value 304. Counter value 304 counts a difference between the number of times a branch instruction is taken and the number of times a branch instruction is not taken within the time period.

Taking branch[1] as an example, referring to BST 200, the number of times this branch instruction was encountered during the time period is 28, and number of times this branch instruction was actually taken is 3. Hence, the number of times this branch instruction is not taken during the time period is 25. The difference between the number of times branch[1] is taken and the number of times branch[1] is not taken within the time period is then −22. BST 300 can store this value instead of the two counter values of BST 200 to characterize the program flow of executing the program. In some implementations, the single counter value 304 can be some other value derived from the number of times a branch instruction is taken and the number of times a branch instruction is not taken within the time period such as a weighted difference.

Figure 4:
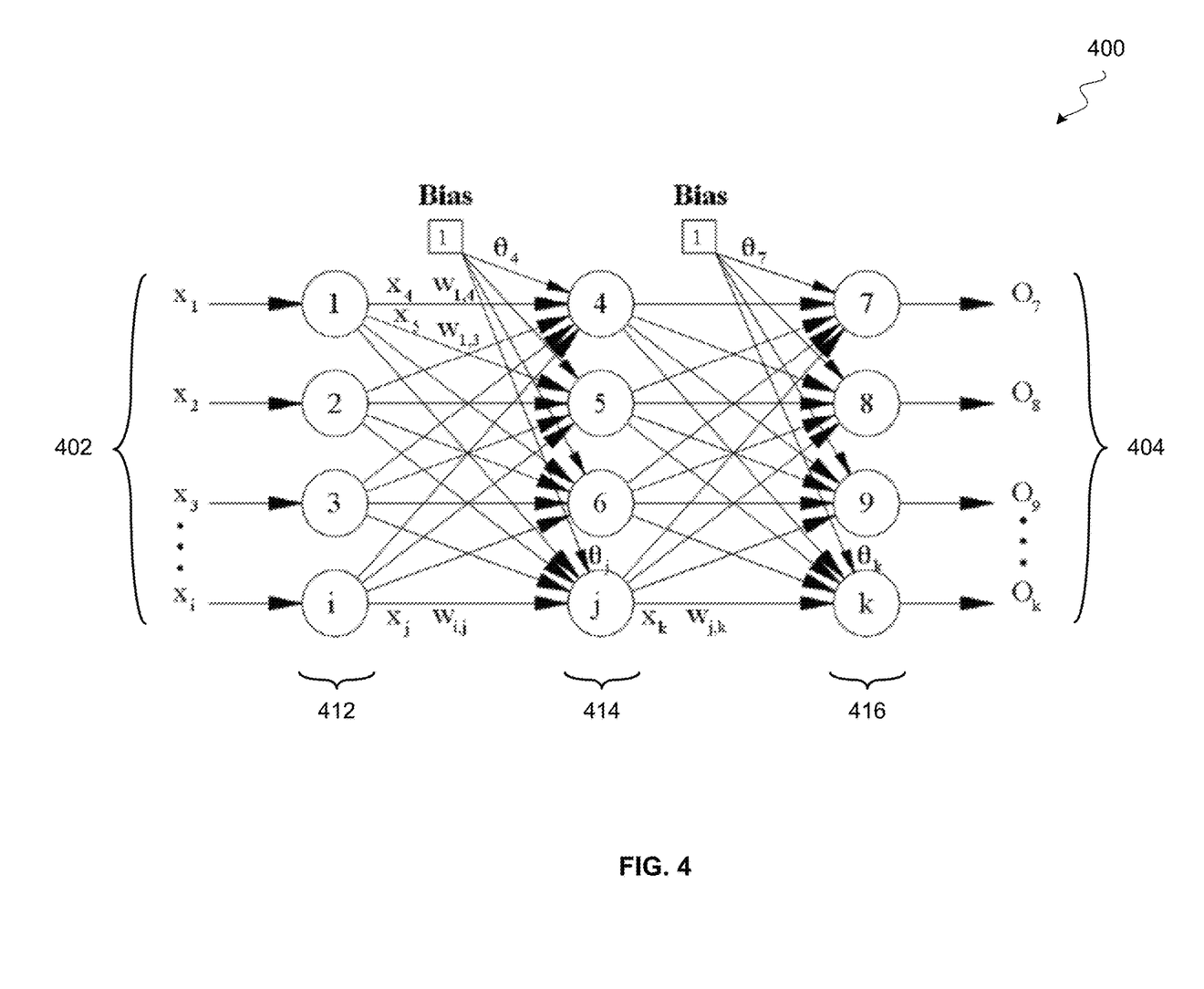
FIG. 4 illustrates an example of a neural network model.

Once the execution events statistics have been collected, the execution events statistics can be used to train a machine learning model such as a neural network model. FIG. 4 illustrates an example of a neural network model 400 that can be used to classify program flows. Neural network model 400 shown in FIG. 4 is a multilayer perceptron having an input layer 412, a single hidden layer 414, and an output layer 416. Neural network model 400 shown in FIG. 4 has the same number of inputs 402 and outputs 404. However, the number of inputs 402 need not be equal to the number of outputs 404. It should also be understood that neural network model 400 is just one example of a suitable neural network model that can be used to classify program flows, and that other neural network architectures can be used in other implementations.

Referring to FIG. 4, each of inputs 402 may correspond to an execution event, and each of outputs 404 may correspond to a prediction as to whether the corresponding execution event will occur during program execution given the set of inputs 402. Thus, continuing with the example above of using branch instructions as execution events, each input may correspond to an individual branch instruction, and each output may correspond to a prediction as to whether the corresponding branch instruction is taken. Neural network model 400 can be trained, for example, by feeding the counter values of each branch instruction collected over a time period into the corresponding input, and comparing the prediction from neural network model 400 as to whether a corresponding branch instruction is actually taken when the branch instruction is next encountered. The difference or hit-loss can be used during backward propagation to adjust the weight values in the neural network model 400 to improve the prediction results.

The counter values for all execution events collected over each time period may correspond to one set of training data. The software program can be executed, for example, over a million times with valid input data to generate sufficient training data for neural network model 400 to predict normal program flows. In some implementations, random or invalid input vectors can also be used to generate training data for abnormal program flows.

In some implementations, other factors such as the time intervals of a day (e.g., 8 am to 10 am, 10 am to noon, etc.) when the program is executed can be correlated with the execution events. In such implementations, the neural network model may include additional inputs for each correlating factor. For example, the neural network model may add one additional input to account for the time of day, and that input can be fed time information such as a numeric value representing the time of day when the corresponding execution events statistics are collected. In some implementations, instead of predicting on each execution event individually, a neural network model can predict on a combination of execution events (e.g., likelihood that two branch instructions would both be taken, both not taken, or one or the other is taken, etc.). In such implementations, each output of the neural network model may correspond to a prediction of a combination of execution events occurring during program execution, and the number of outputs of the neural network model can be greater than the number of inputs.

Figure 5:
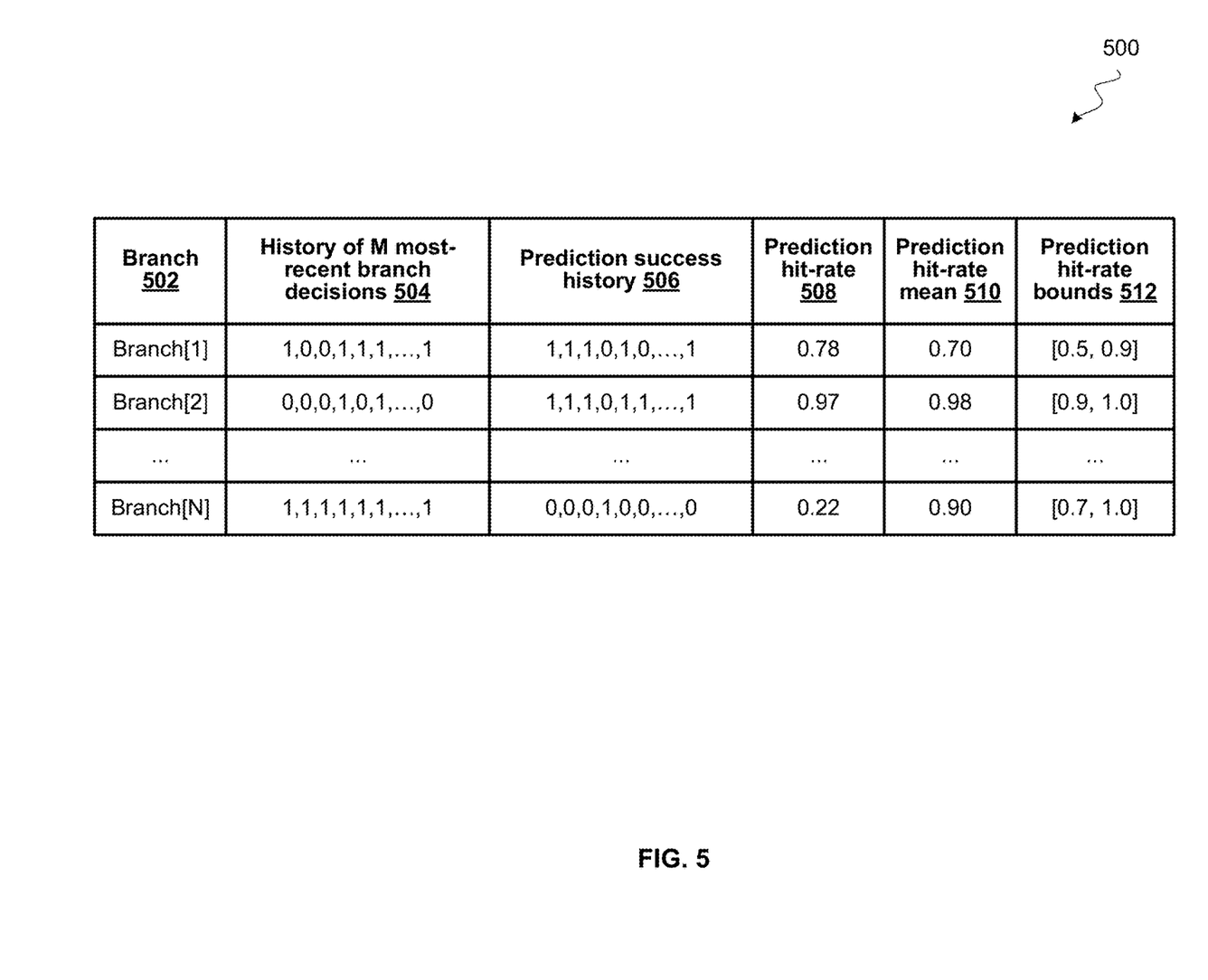
FIG. 5 illustrates a further example of a branch statistics table.

FIG. 5 illustrates another example of a branch statistics table (BST) 500. Similar to BSTs 200 and 300, BST 500 includes a branch identifier 502 for each branch instruction of a program. BST 500 also includes a predetermined number of most-recent branch decisions 504 as the occurrence history information. The predetermined number of most-recent branch decisions 504 may include, for example, a running history of M number of the most recent branch decisions for a particular branch instruction. The number M can be arbitrary, but should be large enough to allow the neural network model to make meaningful predictions, and can be chosen based on the available memory resources and storage capacity of the system. A value of '1' may indicate that the branch instruction was taken, and a value of '0' may indicate that the branch instruction was encounter but not taken.

The predetermined number of most-recent branch decisions 504 can be collected during multiple executions of the program in a controlled environment, and be used to train neural network model 400 in a similar manner as described above. Referring to FIG. 4, each of the inputs 402 to neural network model 400 can be fed with the branch history for a specific branch instruction. Each of the outputs 404 can provide a prediction as to whether the next encounter of the specific branch instruction will be taken or not. In some implementations, the output prediction can be a signed output where a positive value may indicate a branch being taken, and a negative value may indicate a branch not taken. During training, the prediction of each branch instruction can be compared with the actual decision taken by the program execution, and the difference can be applied to a loss function to minimize the accumulative loss of all branch predictions.

After the neural network model 400 has been trained using the branch instruction statistics, the software program can be released for general use on a host processor of a host system. In some implementations, the host system may include a security chip coupled to the host processor to monitor activity on the host system. The neural network model can be executed in the security chip to monitor execution events during program execution of the program on the host processor. The branch decisions during program execution on actual workload can be fed to neural network model 400 to collect additional statistics and detect whether a program flow during the program execution deviates from the branch instruction statistics.

Referring to BST 500 in FIG. 5, the additional statistics collected during inference may include prediction success history 506, which tracks whether the neural network model successfully predicted the branch decisions, and may include the same M number of values as the number of most-recent branch decisions 504. A value of '1' may indicate that the branch decision was predicted successfully, and a value of '0' may indicate that the branch decision was not predicted correctly. BST 500 also includes a prediction hit-rate 508, a prediction hit-rate mean 510, and a prediction hit-rate bounds 512. Prediction hit-rate 508 may indicate the percentage of the most-recent branch decisions that were predicted correctly by the neural network model (e.g., the ratio of 1's to M in prediction success history 506). Prediction hit-rate 508 may indicate the percentage of the most-recent branch decisions that were predicted correctly by the neural network model (e.g., the ratio of 1's to M in prediction success history 506). Prediction hit-rate mean 510 can be a running average of the prediction hit-rates 508 over time, and prediction hit-rate bounds 512 can track the minimum and maximum prediction hit rates that correspond to a normal program flow.

During an inference operation, an abnormality in the program flow can be detected if the prediction hit-rate deviates from the prediction hit-rate bounds 512. By way of example, Branch[N] in the last row of BST 500 shows a current prediction hit rate of only 0.22 for this branch instruction. This is well below the prediction hit-rate bounds of 0.7 to 1.0, and thus indicates that the system may have been hacked or is being hacked. In response to detecting that the execution events during program execution on the host system has an abnormality, an alert can be generated to supervisory logic of the host system that an abnormal execution flow of the program has been detected. For example, the supervisory logic can be a kernel of the host system if user program is being monitored, or a hypervisor if the kernel code is being monitored for abnormalities. The greater the deviation from the prediction hit-rate bounds, the more likely that the system may have been hacked or is being hacked. As such, the alert may include information on the extent of the deviation (e.g., percentage above or below the hit-rate bounds). In some implementations, the alert can be, for example, in the form of an interrupt, and different interrupts can be implemented for different severity of deviation. Once the supervisory logic has been alerted to the abnormality, the inspection into the program flow (e.g., the monitoring time period) can be accelerated to increase the confidence level that the system may have been compromised.

Although certain aspects of the techniques for detecting abnormal program flow have been described with reference to branch instructions as the execution events being tracked and monitored, it should be understood that other execution events as well as combinations of different types of execution events can be used. For example, execution of specific processor instructions or sequence of processor instructions, execution of virtual machine instructions (e.g., Java Virtual Machine (JVM) instructions), execution of specific lines of code, triggering of specific interrupts, and/or utilization levels of execution units (or any combination thereof) can be used as the execution events. The statistics collected for these execution events can include, for example, the number of times an instruction or sequence of instructions has been executed in a time period; the number of times a line of code is executed in a time period; the number of certain type of interrupt being triggered in a time period; or an average, minimum, and maximum utilization level of an execution unit during a time period.

When performing predictions for combinations of execution events, different types of execution events can also be combined. For example, branch instructions can be combined with interrupts events, and the inputs to the neural network model may include one input for each branch instruction and one input for each interrupt. The outputs to the neural network model may include one output for each combination of branch instruction and interrupt being tracked and monitored. It should be understood that these are just examples, and that other implementations may include different permutations of different and/or same types of execution events.

As mentioned above, a software program can include millions of execution events that can be collected and monitored, and storing statistics for each and every execution event can take up a significant amount of memory. Implementing the statistics table with on-chip memory such as the case when using a security chip can be challenging. To reduce the memory requirements of the statistics table, some implementations may only track and monitor a subset of the execution events (e.g., certain branch instructions but not others). In some implementations, to improve coverage, the totality of all execution events under consideration can be divided into subsets, and different subset of the execution events can be collected/monitored at different time intervals.

Figure 6:
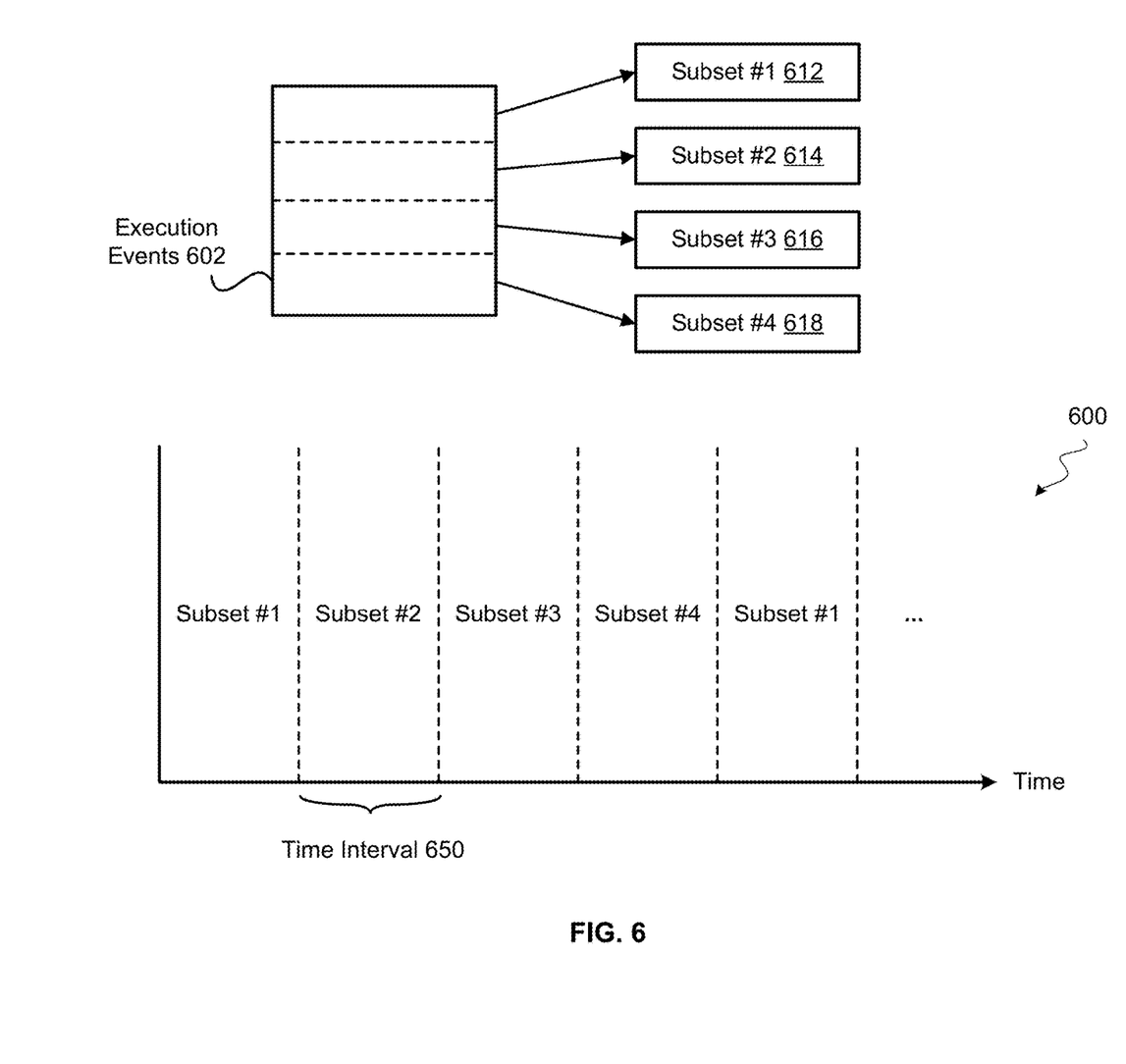
FIG. 6 illustrates an example of dividing up execution events.

FIG. 6 illustrates a conceptual diagram of dividing up the execution events. The totality of execution events being considered can be represented as execution events 602. The execution events 602 can be divided, for example, into four subsets of execution events 612, 614, 616, and 618. It should be understood that execution events can be divided into any number of subsets. The execution events 602 can be divided, for example, according to sequence in the code, by event type, or randomly, etc. Hence, in some implementations, subset of execution events 612 may include the first 200,000 branch instructions, subset of execution events 614 may include the next 200,000 branch instructions, and so on. As another example, subset of execution events 612 may include branch instructions, subset of execution events 614 may include interrupts, and so on. As a further example, subset of execution events 612 may include 200,000 randomly selected execution events, subset of execution events 614 may include another 200,000 randomly selected execution events, and so on.

For training and/or inference, the system may operate on different subsets of the execution events at different time intervals 650. For instance, referring to timing diagram 600, during a first time interval, the system may train or perform inference on the first subset of execution events 612; during a second time interval, the system may train or perform inference on the second subset of execution events 614; during a third time interval, the system may train or perform inference on the third subset of execution events 616; during a fourth time interval, the system may train or perform inference on the fourth subset of execution events 618; during a fifth time interval, the system may train or perform inference again on the first subset of execution events 612; and so on. In some implementations, the subsets of execution events being operated on can be selected in a round-robin fashion as shown. In other implementations, the subsets of execution events can be operated on at random, pseudo-randomly, or according to a suitable algorithm or pattern.

Figure 7:
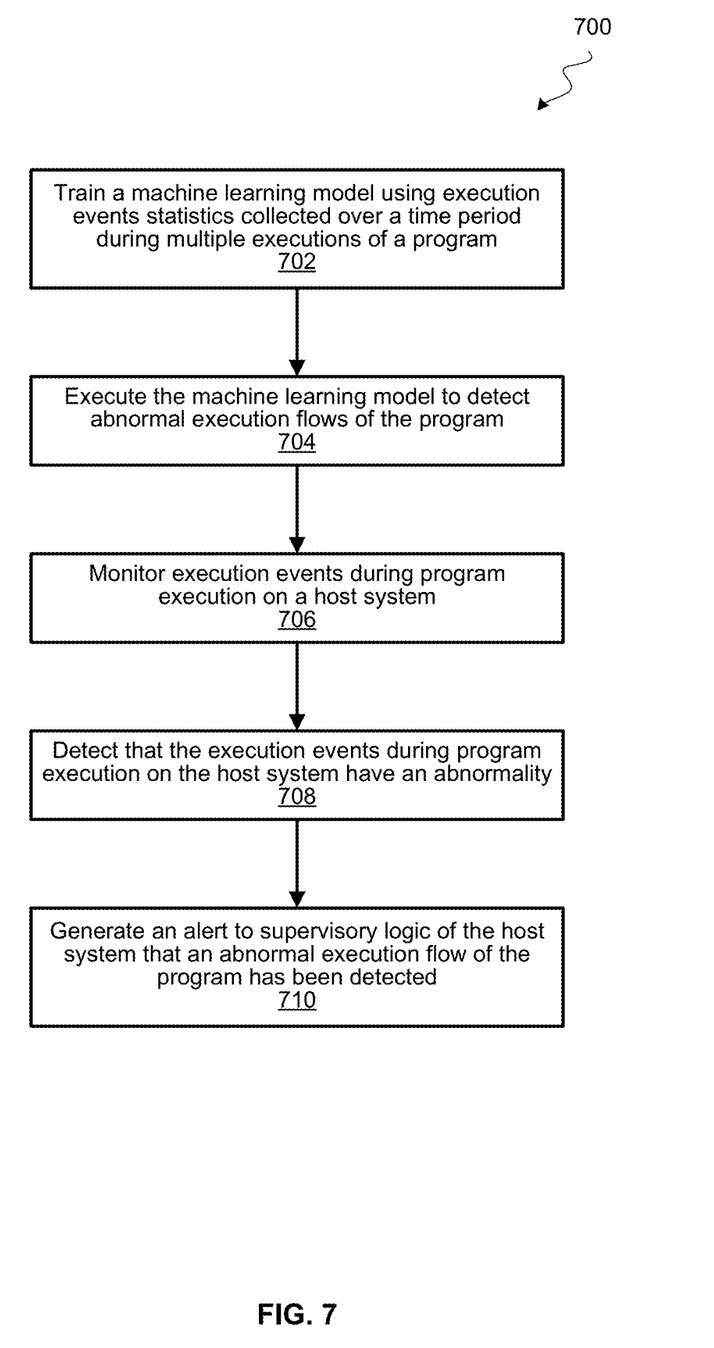
FIG. 7 illustrates a flow diagram of an example of a process for performing program flow classification.

FIG. 7 illustrates a flow diagram of an example of a process 700 for detecting abnormalities of a program flow, according to some implementations. Process 700 can be implemented, for example, using software such as code stored in a computer readable storage medium. Process 700 can be also be performed by specific hardware, for example, using dedicated circuitry in a security chip or other types of hardware accelerators, or a combination of software and hardware.

Process 700 may begin at block 702 by training a machine learning model (e.g., neural network model, linear regression model, etc.) using execution events statistics of a software program running on a computing system. The execution events statistics may include statistics of execution events such as execution of branch instructions, execution of specific processor instructions or sequence of processor instructions, execution of specific lines of code, triggering of specific interrupts, etc. For example, the execution events statistics may include counts of occurrences of such events over periodic time intervals. In some implementations, the execution events may include utilization levels of execution units of a computing system (e.g., processor utilization, acceleration engine utilization, etc.). In such implementations, the collected statistics may include, for example, average, minimum, and/or maximum utilization levels during the periodic time intervals. In some implementations, the software program can be executed in a controlled environment during the statistics collection for training, such as prior to releasing the software program for general use. The software program can be executed multiple times using valid input data to train the machine learning model to establish a base line for normal program flows. In some implementations, the software program can be executed multiple times using random and/or invalid input data to train the machine learning model with abnormal program flows.

In some implementations, the machine learning model can be a neural network model having a multilayer perceptron architecture or other suitable neural network architecture. Each of the inputs to the neural network model may correspond to an execution event, and each of the input of the neural network model can be fed the statistics collected for the corresponding execution event. In some implementations, the execution events can be correlated with other factors such as time of day, location, hardware attributes (e.g., processor speed and type), and each of such factors may correspond to an additional input to the neural network model. Each output of the neural network may correspond to a prediction of whether a specific execution event will occur. In some implementations, the neural network model can be trained to predict on combination of execution events (e.g., combination of two branch instructions being taken, execution of a processor instruction and an interrupt being triggered, etc.). In such implementations, each output of the neural network may correspond to a prediction of a combination of execution events. Some implementations may also perform predictions on both individual execution events as well as combination of execution events. In such implementations, the neural network model may include an output per individual execution event, as well as an output per combination of execution events.

At block 704, after the machine learning model has been trained, the machine learning model can be executed to perform an inference operation to detect abnormal execution flows of the software program. Block 704 can be performed, for example, after the software program has been release for general use. In some implementations, the machine learning model can be executed by supervisory logic of a host system. The supervisory logic can be, for example, a kernel of the host system if user programs are being monitored, or a hypervisor if the kernel code itself is being monitored for abnormalities. In some implementations, the supervisory logic can be implemented in a security chip that has dedicated hardware resources to monitor programs running on the host system. It should also be noted that the host system executing the machine learning model for the inference operation need not be the same system on which the machine learning model was trained. For example, once the machine learning model has been trained for a particular software program, the machine learning model can be deployed on any host system that allows users to run and execute that software program.

At block 706, the machine learning model is used to monitor execution events during program execution of the software program on the host system. Statistics such as occurrences of the execution events over a periodic time interval can be collected during the inference operation, and such information can be fed into the machine learning model to determine if the flow of execution events are typical of that of a normal program run. In some implementations, the host system may provide multiple virtual machines for different users of the host system. One or more of the virtual machines may allow execution of the software program. In such implementations, the execution events can be monitored per virtual machine. In other words, each virtual machine can be monitored independently for abnormalities of the program flow. Although a separate instance of the machine learning model can be executed for each virtual machine, a single instance of the machine learning model can also be used by interleaving the monitoring of the virtual machines. For example, a single machine learning model may monitor the execution events on a first virtual machine during a first time interval, then switch to monitoring a second virtual machine during a second time interval, etc. It should also be noted that even after the software program has been released for general use, the machine learning model can continue to be trained further using the statistics collected at block 706. This can further improve the accuracy of the machine learning model by feeding the model with statistics collected during real usage of the software program.

At block 708, the machine learning model may detect that the execution events during program execution on the host system has an abnormality. For example, the statistics of an execution event (or a combination of execution events) collected during the inference operation may deviate from the typical prediction bounds of that execution event (or combination of execution events). In some implementations, an abnormality is detected if, for example, the prediction hit-rate falls below or rise above the prediction hit-rate bounds for that event. In some implementations, a guardband can be implemented to filter out borderline program flow behaviors. For example, an abnormality can be detected if the prediction hit-rate is a threshold amount below the lower prediction hit-rate bound, or if the prediction hit-rate is a threshold amount above the upper prediction hit-rate bound.

At block 710, in response to detecting that an abnormality has occurred, an alert (e.g., an interrupt) can be generated to indicate that an abnormal execution flow of the program has been detected. In some implementations, the alert is provided to supervisory logic such as the kernel or hypervisor to take corrective actions on the abnormal behavior. The alert may include information such as the extent to which the prediction hit-rate deviated from the expected bounds, which virtual machine the abnormality is detected on, a time stamp of when the abnormality was detected, etc. The supervisory logic may increase monitoring of the program and/or virtual machine to increase the confidence that the machine may have been hacked or is being hacked, halt execution on the virtual machine, and/or generate a message for a system administrator indicating a potential security breach, etc.

Figure 8:
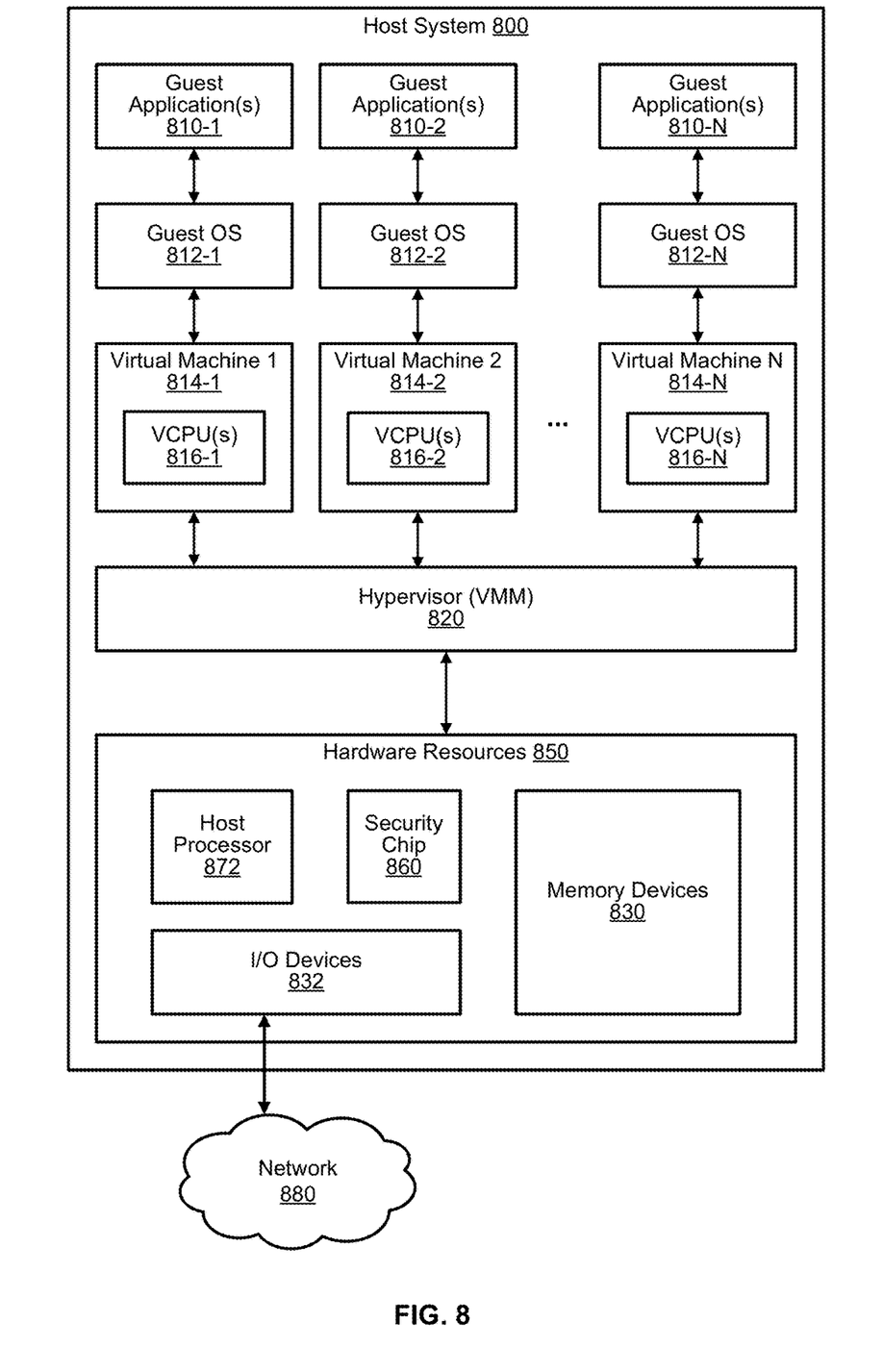
FIG. 8 illustrates a block diagram of an example of a host system.

FIG. 8 includes a block diagram of an example of a host system 800, according to some implementations. Host system 800 may include hardware resources 850, and may provide a hypervisor 820 executing on hardware resources 850 (e.g., through a host operating system) to manage one or more virtual machines on host system 800, such virtual machines 814-1 to 814-N. Hypervisor 820 may also be referred to as a virtual machine manager (VMM), and can support multiple virtual devices on a single physical device in a virtualized environment. Hypervisor 820 can also manage the flow of information between software, the virtualized hardware, and the physical hardware. Hypervisor 820 can be configured to create, start, monitor, stop, or delete each of virtual machines 814-1 to 814-N, and may execute at a higher privilege level than virtual machines 814-1 to 814-N. In some implementations, hypervisor 820 can manage access controls, resources, scheduling, isolation, etc., for virtual machines 814-1 to 814-N that execute their respective guest operating systems. In some implementations, hypervisor 820 can be implemented as a software layer or as code embedded in firmware on host system 800.

Each of virtual machines 814-1 to 814-N may act as an independent computer system that is being managed by hypervisor 820. Each of virtual machines 814-1 to 814-N can run one or more independent operating systems and one or more software programs on hardware resources 850. Two or more of virtual machines 814-1 to 814-N may execute simultaneously or in any order on host system 800. For example, in some instances, at a given time, virtual machines 814-1 to 814-N may execute simultaneously on host system 800. In some instances, virtual machines 814-1 to 814-N may execute on host system 800 one at a time. For example, hypervisor 820 may create and start virtual machine 814-1 for a first user. After the user finishes running a software program on virtual machine 814-1, hypervisor 820 may stop and delete virtual machine 814-1, and create and start virtual machine 814-2 for a second user, and so on.

Each of virtual machines 814-1 to 814-N may be assigned one or more virtual CPUs (VCPUs) 816-1 to 816-N. VCPUs are mapped to allocated time slices of available logical processors in the physical computer and can be scheduled by the hypervisor 820 to allow more virtual processors than available logical processors. One or more guest operating systems 810-1 to 810-N may run on the one or more VCPUs 816-1 to 816-N in virtual machines 814-1 to 814-N, respectively. One or more guest applications 810-1 to 810-N may in turn include one or more software programs that run on and managed by the corresponding guest operating systems.

According to some implementations, a higher-privileged entity of host system 800 can perform collection of execution events statistics to train a machine learning model, and can thereafter, execute the machine learning model to monitor execution events for abnormal program flows. Referring to FIG. 8, when the software program(s) being monitored for abnormal behavior are guest applications 810-1 to 810-N, a kernel executing in guest OSes 812-1 to 812-N can execute the machine learning model to train for and detect abnormal program flows. When the software program(s) being monitored for abnormal behavior are the guest OSes 812-1 to 812-N themselves, then hypervisor 820 can execute the machine learning model to train for and detect abnormal program flows. In some implementations, a dedicated security chip such as security chip 860 can execute the machine learning model to train for and detect abnormal program flows in any of the virtual machines 814-1 to 814-N. Security chip 860 may include its own dedicated resources to perform security functions such as dedicated memory to store execution event statistics.

The hardware resources 850 of host system 800 may include a host processor 872, memory devices 830, I/O devices 832, a security chip 860, and support systems (not shown). In various implementations, the host system 800 can include other hardware that is not illustrated here. The host processor 872 can be a general-purpose integrated circuit that is capable of executing program instructions. In some examples, the host processor 872 can include multiple processing cores. A multi-core processor may include multiple processing units within the same processor. In some examples, the host system 800 can include more than one host processor 872. In some examples, the host processor 872 and the security chip 860 can be one chip, such as, one or more integrated circuits within the same package.

In various examples, the host processor 872 can communicate with other components in the host system 800 over one or more communication channels. For example, the host system 800 can include a host processor bus, which the host processor 872 can use to communicate with memory devices 830, for example. As another example, the host system 800 can include an I/O bus, such as a PCI-based bus, over which the host processor 872 can communicate with the I/O devices 832. In various examples, the host system 800 can, alternatively or additionally, include other communication channels or busses, such as serial busses, power management busses, storage device busses, and so on.

Memory devices 830 can include memory devices such as DRAM, SRAM, flash memory, etc. that is used by the host processor 872 for storage of program code that the host processor 872 is in the process of executing. Though not illustrated here, the host system 800 can include other volatile and non-volatile memories for other purposes. For example, the host system 800 can include a Read-Only Memory (ROM) that stores boot code for booting the host system 800 at power on, and/or Basic Input/Output System (BIOS) code. Though not illustrated here, memory devices 830 can store instructions for various programs, which can be loaded into and be executed by the host processor 872. For example, the memory devices 830 can store instructions for an operating system (e.g., any of guest OS 812-1 to 812-N), one or more data stores, one or more application programs, one or more drivers, and/or services for implementing the features disclosed herein.

The operating system can manage and orchestrate operations such as scheduling tasks, executing applications, and/or controller peripheral devices, among other operations. In some examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers.

Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 800. For example, some drivers can provide communication between the operating system and peripheral devices or I/O devices 832. Alternatively or additionally, some drivers may provide communication between application programs and the operating system, and/or application programs and peripheral devices accessible to the host system 800. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 832 can include hardware for connecting to user input and output devices, such as keyboards, mice, pens, tablets, voice input devices, touch input devices, displays or monitors, speakers, and printers, among other devices. The I/O devices 832 can also include storage drives and/or network interfaces for connecting to a network 880. For example, the host system 800 can use a network interface to communicate with storage devices, user terminals, other computing devices or servers, and/or other networks, among various examples.

In various examples, one or more of the I/O devices 832 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 800 or may be in an external enclosure. A storage device can be fixed (e.g., attached by screws) or removable (e.g., having a physical release mechanism and possibly a hot-plug mechanism).

Storage devices, memory devices 830, and any other memory component in the host system 800 are examples of computer-readable storage media. Computer-readable storage media are physical mediums that are capable of storing data in a format that can be read by a device such as the host processor 872. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 832 can be PCI-based devices. In these examples, a PCI-based I/O device includes a PCI interface for communicating with the host system 800. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The host system 800 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

Figure 9:
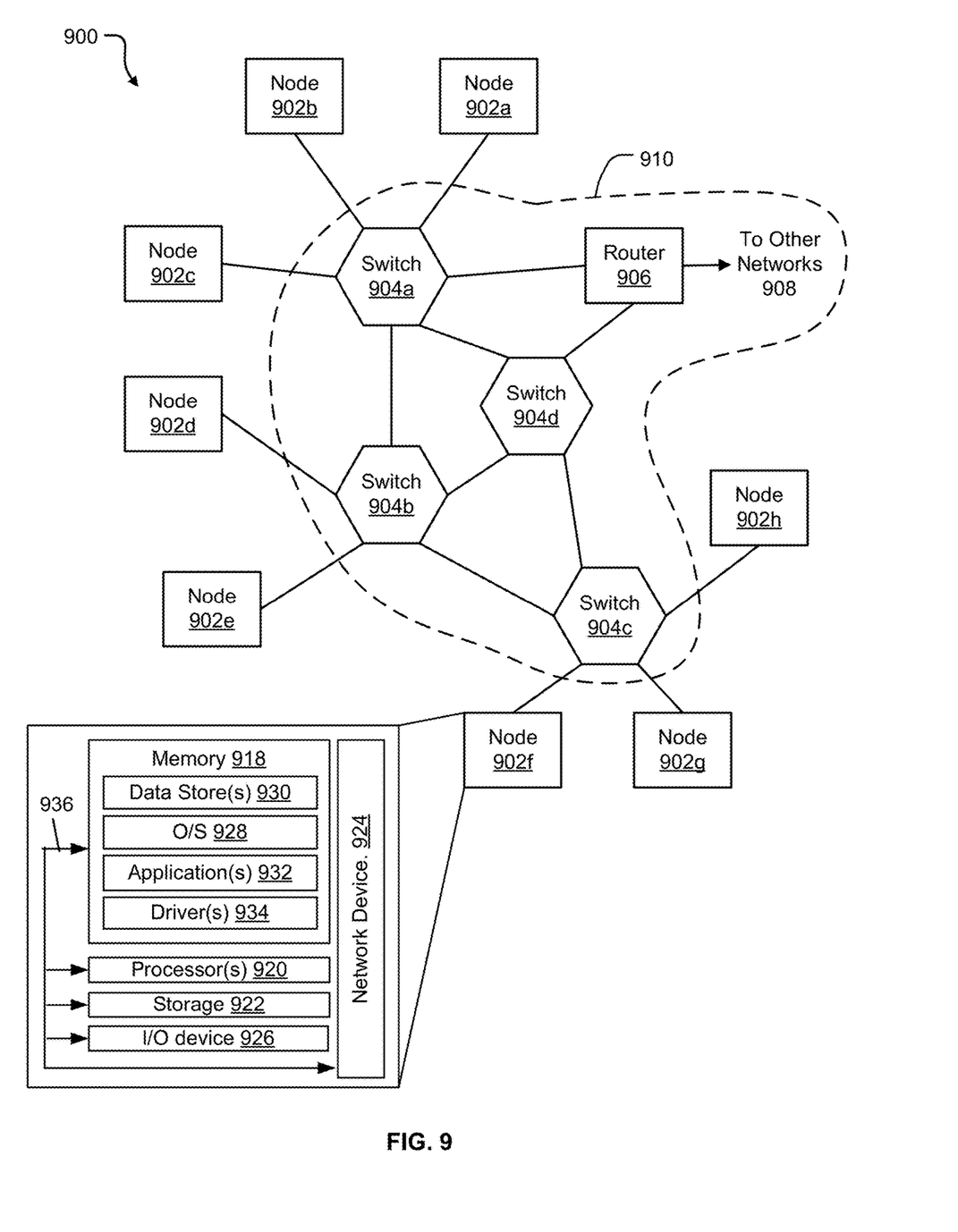
FIG. 9 illustrates a diagram of an example of a network.

FIG. 9 includes a diagram of an example network 900, which can include one or more host systems, such as the host system illustrated in FIG. 8. For example, the example network 900 of FIG. 9 includes multiple nodes 902a-902h, one or more of which can be a host system such as is illustrated in FIG. 8. Others of the nodes 902a-902h can be other computing devices, each of which include at least a memory for storing program instructions, a processor for executing the instructions, and a network interface for connecting to the network 900.

In various examples, the network 900 can be used to process data. For example, input data can be received at one of the nodes 902a-902h or from other networks 908 with which the network 900 can communicate. In this example, the input data can be directed to a node in the network 900 that includes an acceleration engine, for the acceleration engine to operate on and produce a result. The result can then be transferred to the node or other network from which the input data was received. In various examples, input data can be accumulated from various sources, including one or more of the nodes 902a-902h and/or computing devices located in the other networks 908, and the accumulated input data can be directed to one or more host systems in the network 900. Results from the host systems can then be distributed back to the sources from which the input data was gathered.

In various examples, one or more of the nodes 902a-902h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 9, the nodes 902a-902h are connected to one another using a switched architecture with point-to point links. The switched architecture includes multiple switches 904a-904d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 904a-904d of FIG. 9 may be connected to the nodes 902a-902h and provide multiple paths between any two nodes.

The network 900 may also include one or more network devices for connection with other networks 908, such as a router 906. Routers use headers and forwarding tables to determine the best path for forwarding the packets, and use protocols such as internet control message protocol (ICMP) to communicate with each other and configure the best route between any two devices. The router 906 of FIG. 9 can be used to connect to other networks 908 such as subnets, LANs, wide area networks (WANs), and/or the Internet.

In some examples, network 900 may include any one or a combination of many different types of networks, such as cable networks, the Internet, wireless networks, cellular networks and other private and/or public networks. The interconnected switches 904a-904d and the router 906, if present, may be referred to as a switch fabric 910, a fabric, a network fabric, or simply a network. In the context of a computer network, terms "fabric" and "network" may be used interchangeably herein.

The nodes 902a-902h may be any combination of host systems, processor nodes, storage subsystems, and I/O chassis that represent user devices, service provider computers or third-party computers.

User devices may include computing devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 902a-902h may include at least one memory 918 and one or more processing units (or processor(s) 920). The processor(s) 920 may be implemented in hardware, computer-executable instructions, firmware, or combinations thereof Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more application programs 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 928 may also be a proprietary operating system.

The data stores 930 may include permanent or transitory data used and/or operated on by the operating system 928, application programs 932, or drivers 934. Examples of such data include web pages, video data, audio data, images, user data, and so on. The information in the data stores 930 may, in some implementations, be provided over the network(s) 908 to user devices. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between application programs 932 and the operating system 928, and/or application programs 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network.

The node(s) 902a-902h may also contain network device(s) 924 that allow the node(s) 902a-902h to communicate with a stored database, another computing device or server, user terminals and/or other devices on the network(s) 900.

In some implementations, the network device 924 is a peripheral device, such as a PCI-based device. In these implementations, the network device 924 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 924 may be connected to a computing system using a PCIe interface.

A PCI-based device may include one or more functions. A "function" describes operations that may be provided by the network device 924. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 924 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method for detecting an abnormal execution flow of a program, the method comprising:
    executing a program multiple times in a controlled environment using valid input data;
    collecting branch instruction statistics for branch instructions of the program during execution of the program in the controlled environment;
    training a neural network model using the branch instruction statistics;
    releasing the program for general use on a host system;
    executing the neural network model on the host system;
    monitoring, by the neural network model, program execution of the program on the host system, wherein the neural network model has an input layer comprising a plurality of inputs corresponding to the branch instructions of the program to receive occurrence data of the respective branch instructions;
    detecting, by the neural network model, that a program flow during the program execution deviates from the branch instruction statistics; and
    generating an interrupt to a hypervisor of the host system that the abnormal execution flow of the program has been detected.

2. The computer-implemented method of claim 1, further comprising:
    executing the program multiple times in the controlled environment using invalid input data; and
    training the neural network model using additional branch instruction statistics based on the invalid input data.

3. The computer-implemented method of claim 1, wherein the branch instruction statistics include, for each of a plurality of branch instructions in the program, a count of a number of times that a branch instruction has been encountered, and a count of a number of times that a branch of the branch instruction is taken.

4. The computer-implemented method of claim 1, wherein the branch instruction statistics are stored in a branch statistics table, and each branch instruction is assigned an address in the branch statistics table.

5. The computer-implemented method of claim 1, wherein the neural network model is a multilayer perceptron neural network model have an equal number of inputs and outputs.

6. A computer-implemented method comprising:
training a machine learning model using execution events statistics collected over a time period during multiple executions of a program;
executing the machine learning model to detect abnormal execution flows of the program;
monitoring, by the machine learning model, execution events during program execution on a host system;
detecting, by the machine learning model, that the execution events during program execution on the host system have an abnormality; and
generating an alert to supervisory logic of the host system that an abnormal execution flow of the program has been detected,
wherein the machine learning model has an input layer comprising a plurality of inputs corresponding to the execution events of the program to receive occurrence data of the respective execution events.

7. The computer-implemented method of claim 6, wherein the machine learning model is a multilayer perceptron neural network model.

8. The computer-implemented method of claim 7, wherein the execution events are correlated with time intervals of a day, and time information representing time of day corresponds to one of the inputs of the multilayer perceptron neural network model.

9. The computer-implemented method of claim 7, wherein each output of the multilayer perceptron neural network model corresponds to a prediction of an execution event occurring during program execution.

10. The computer-implemented method of claim 7, wherein each output of the multilayer perceptron neural network model corresponds to a prediction of a combination of execution events occurring during program execution.

11. The computer-implemented method of claim 6, wherein the execution event statistics are stored in a statistics table, and the execution event statistics include, for each execution event, occurrence history information of the execution event within the time period.

12. The computer-implemented method of claim 11, wherein the execution events include branch instructions in the program, and the occurrence history information includes, for each branch instruction, a first counter value counting a number times a branch instruction is encountered within the time period, and a second counter value counting a number of times the branch instruction is taken within the time period.

13. The computer-implemented method of claim 11, wherein the execution events include branch instructions in the program, and the occurrence history information includes, for each branch instruction, a counter value derived from a number of times a branch instruction is taken and a number of times a branch instruction is not taken within the time period.

14. The computer-implemented method of claim 13, wherein the execution events include branch instructions in the program, and the occurrence history information includes, for each branch instruction, a predetermined number of most-recent branch decisions.

15. The computer-implemented method of claim 13, wherein the statistics table further includes, for each execution event, a prediction hit rate, a prediction hit-rate mean, and a prediction hit-rate bounds.

16. The computer-implemented method of claim 6, wherein the execution events include branch instructions, processor instructions, virtual machine instructions, lines of code being executed, interrupt events, or utilization levels of execution units.

17. The computer-implemented method of claim 6, wherein the execution events are divided into multiple subsets of execution events, and wherein monitoring the execution events includes monitoring different subsets of execution events at different time intervals, respectively.

18. A non-transitory computer-readable medium having stored therein code that, when executed by one or more processors, causes the one or more processors to perform operations including:
training a machine learning model using execution events statistics collected over a time period during executions of a program;
executing the machine learning model to detect abnormal execution flows of the program;
monitoring, by the machine learning model, execution events during program execution;
detecting, by the machine learning model, that the execution events during program execution have an abnormality; and
generating an alert that an abnormal execution flow of the program has been detected,
wherein the machine learning model has an input layer comprising a plurality of inputs corresponding to the execution events of the program to receive occurrence data of the respective execution events.

19. The non-transitory computer-readable medium of claim 18, wherein the execution events include branch instructions, processor instructions, virtual machine instructions, lines of code being executed, interrupt events, or utilization levels of execution units.

20. The non-transitory computer-readable medium of claim 18, wherein the execution events are divided into multiple subsets of execution events, and wherein monitoring the execution events includes monitoring different subsets of execution events at different time intervals, respectively.

21. The non-transitory computer-readable medium of claim 18, wherein the machine learning model is a multilayer perceptron neural network model.

* * * * *